United States Patent
Wilson et al.

(10) Patent No.: US 8,748,781 B2
(45) Date of Patent: Jun. 10, 2014

(54) PORTABLE GRILLING APPARATUS

(76) Inventors: Brian R. Wilson, Columbus, IN (US); Bradley C. Wilson, Greenwood, IN (US); Michael D. Sever, Franklin, IN (US); Kyle William Martin, Decatur, IN (US)

( * ) Notice: Subject to any disclaimer, the term of this patent is extended or adjusted under 35 U.S.C. 154(b) by 883 days.

(21) Appl. No.: 12/792,118

(22) Filed: Jun. 2, 2010

(65) Prior Publication Data

US 2011/0297010 A1     Dec. 8, 2011

(51) Int. Cl.
*H05B 3/68*      (2006.01)

(52) U.S. Cl.
USPC ........................................ 219/450.1; 219/482

(58) Field of Classification Search
USPC .......... 219/450.1, 482, 483; 99/380, 444, 378
See application file for complete search history.

(56) References Cited

U.S. PATENT DOCUMENTS

| | | | |
|---|---|---|---|
| 3,757,194 A | 9/1973 | Weber et al. | |
| 4,591,777 A | 5/1986 | McCarty et al. | |
| 6,037,571 A * | 3/2000 | Christopher | ............... 219/450.1 |
| 6,369,366 B1 | 4/2002 | Mullen | |
| 6,876,173 B2 | 4/2005 | Mastaler et al. | |
| 7,183,745 B2 | 2/2007 | Kubale et al. | |
| 7,301,128 B2 | 11/2007 | Li et al. | |
| 7,526,833 B2 | 5/2009 | Cochran et al. | |
| 2009/0152276 A1 | 6/2009 | Groll | |
| 2009/0320695 A1* | 12/2009 | Serra et al. | ...................... 99/380 |

FOREIGN PATENT DOCUMENTS

| | | |
|---|---|---|
| JP | S63-271035 | 11/1988 |
| JP | H04-155777 | 5/1992 |
| JP | H06-237869 | 8/1994 |
| JP | H09-327376 | 12/1997 |

OTHER PUBLICATIONS

English language abstract of JPS63-271035.
English language abstract of JPH04-155777.
English language abstract of JPH06-237869.
English language abstract of JPH09-327376.

* cited by examiner

*Primary Examiner* — Brian Jennison
(74) *Attorney, Agent, or Firm* — DASCENZO Intellectual Property Law, P.C.

(57) ABSTRACT

A portable grilling apparatus includes a power adapter having first and second receiving areas each configured to respectively receive a battery, the power adapter having circuitry for receiving electricity at the first and second receiving areas and producing a single electrical output. The apparatus includes a grill portion having a lower grill housing, a support element having a cooking surface for receiving food thereon, and an electrical heating element in the lower grill housing. The electrical heating element is positioned below the cooking surface and the electrical heating element is in electrical communication with the single electrical output circuitry. The apparatus includes a positioning portion operatively coupling the power adapter to the grill portion, the positioning portion having an attachment member for securement to an object.

35 Claims, 5 Drawing Sheets

PORTABLE GRILLING APPARATUS

BACKGROUND OF THE INVENTION

This invention relates generally to grill devices and, more particularly, to a portable grilling apparatus for powering an electrical heating element with a rechargeable battery removably received in a power adapter.

Grilling meat products on an outdoor grill has become a favored activity for many people—some on a year round basis. In fact, the activity of "tail-gating" in the parking lot prior to sporting events such as baseball or football games has become almost a ritual for many sports enthusiasts. This activity, however, requires significant preparation and planning and, unfortunately, is not possible during all sporting or leisure activities. Activities that include mobility and frequent movement away from electricity may not be suitable for grilling. For instance, grilling has not been feasible while moving about a golf course. Nor has it been possible to grill while boating. Other examples where grilling has not historically been possible are numerous and may include long distance highway travel, hiking, off-road riding of motorcycles and 4-wheelers, or the like.

Various devices have been proposed in the art for powering ovens or grills with power sources other than traditional AC electrical current. Although assumably effective for their intended purposes, the existing devices have not presented a truly portable solution to grilling that enables users who are "on the move" in a vehicle to enjoy the grilling experience. In addition, the existing devices and proposals have not presented a portable grill that is safe, secure, and efficient when used in a moving vehicle.

Therefore, it would be desirable to have a portable grilling apparatus that may be held securely and safely in a moving vehicle. Further, it would be desirable to have a portable grilling apparatus having a power adapter configured for using rechargeable batteries from various rechargeable cordless tools. In addition, it would be desirable to have a portable grilling apparatus that is energy efficient for keeping meat products warm and to grill enough food for multiple persons before battery energy is expended.

SUMMARY OF THE INVENTION

A portable grilling apparatus according to the present invention includes a power adapter having first and second receiving areas each configured to respectively receive a battery, the power adapter having circuitry for receiving electricity at the first and second receiving areas and producing a single electrical output. The apparatus includes a grill portion having a lower grill housing, a support element having a cooking surface for receiving food thereon, and an electrical heating element in the lower grill housing. The electrical heating element is positioned below the cooking surface and the electrical heating element is in electrical communication with the single electrical output circuitry. The apparatus includes a positioning portion operatively coupling the power adapter to the grill portion, the positioning portion having an attachment member for securement to an object.

Therefore, a general object of this invention is to provide a portable grilling apparatus for enabling sports enthusiasts to enjoy grilling while engaging in a mobile activity.

Another object of this invention is to provide a portable grilling apparatus, as aforesaid, that may be adjustably positioned and held securely in a moving vehicle.

Still another object of this invention is to provide a portable grilling apparatus, as aforesaid, having a power adapter for receiving at least one rechargeable battery.

Yet another object of this invention is to provide a portable grilling apparatus, as aforesaid, that is efficient enough to prepare food items for more than one person before its batteries need to be recharged.

Other objects and advantages of the present invention will become apparent from the following description taken in connection with the accompanying drawings, wherein is set forth by way of illustration and example, embodiments of this invention.

BRIEF DESCRIPTION OF THE DRAWINGS

FIG. 5b is a sectional view taken along line 5b-5b of FIG. 5a.

DESCRIPTION OF THE PREFERRED EMBODIMENT

A portable grilling apparatus according to the present invention will now be described in detail with reference to FIGS. 1 through 5 of the accompanying drawings. More particularly, a portable grilling apparatus 100 according to one embodiment includes a power adapter 110, a grill portion 130, and a positioning portion 170.

Figure 1:
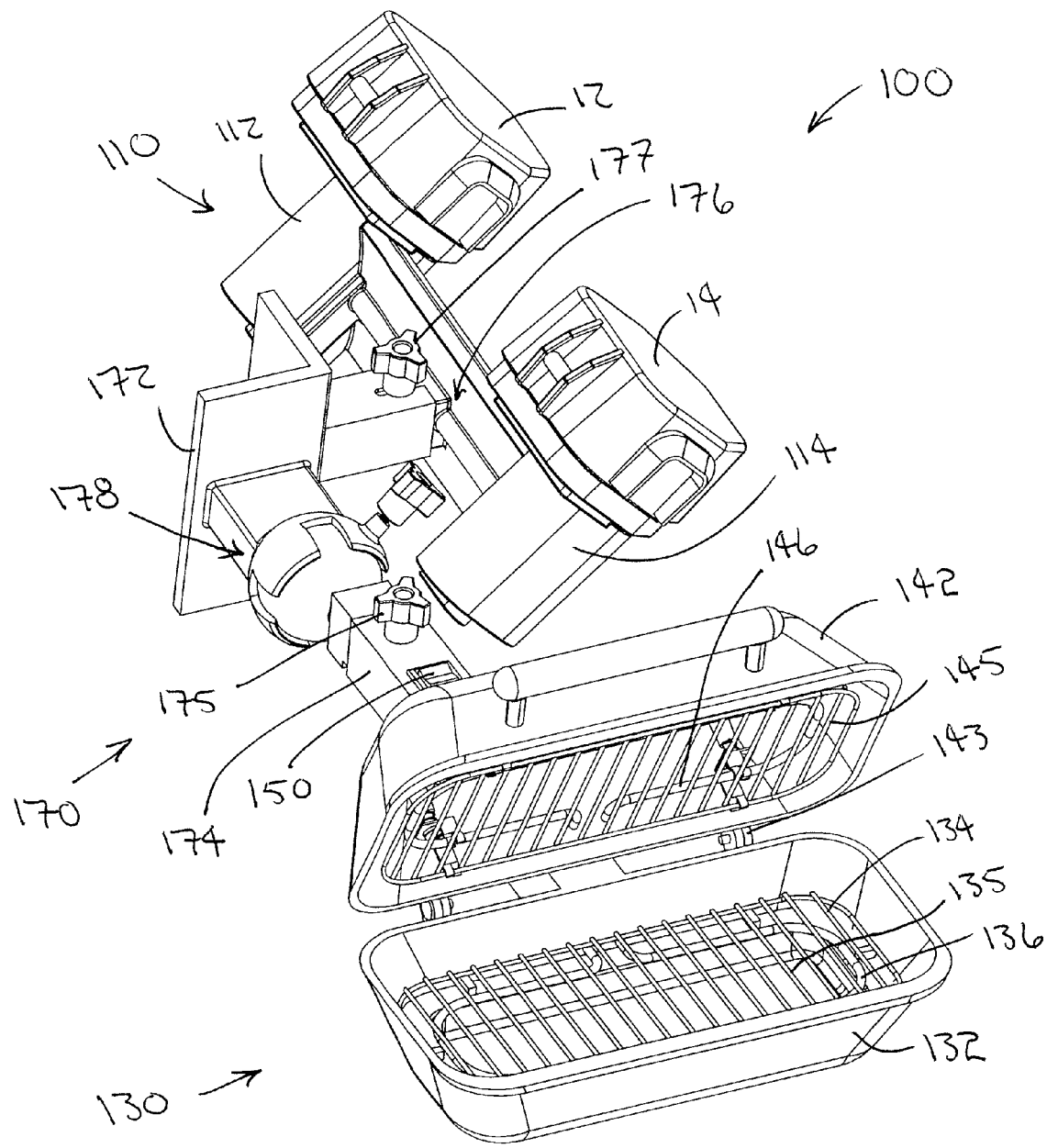
FIG. 1 is a perspective view of a portable grilling device according to a preferred embodiment of the present invention.
Figure 2A:
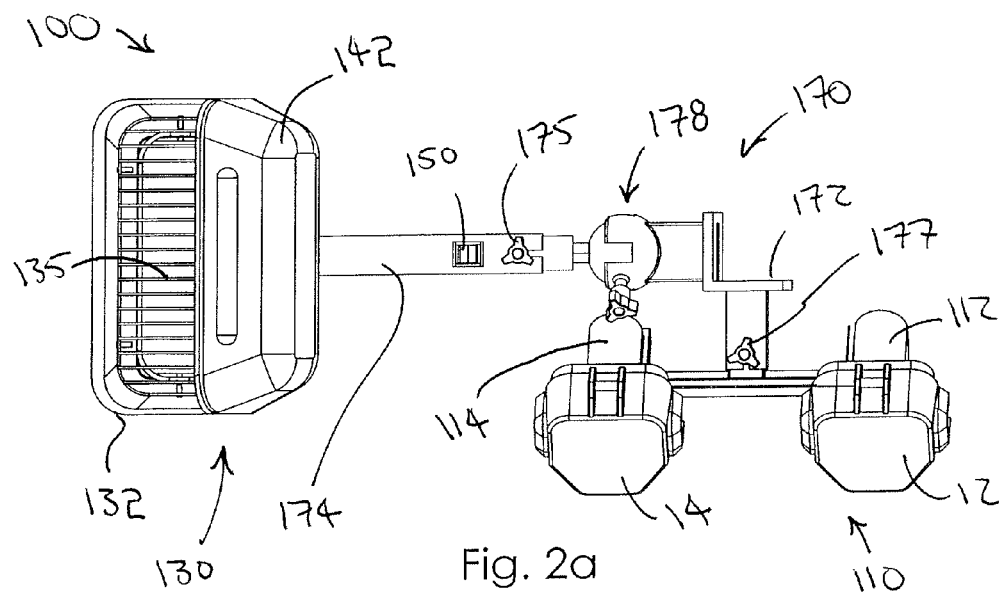
FIG. 2a is a top view of the grilling device as in FIG. 1.
Figure 2B:
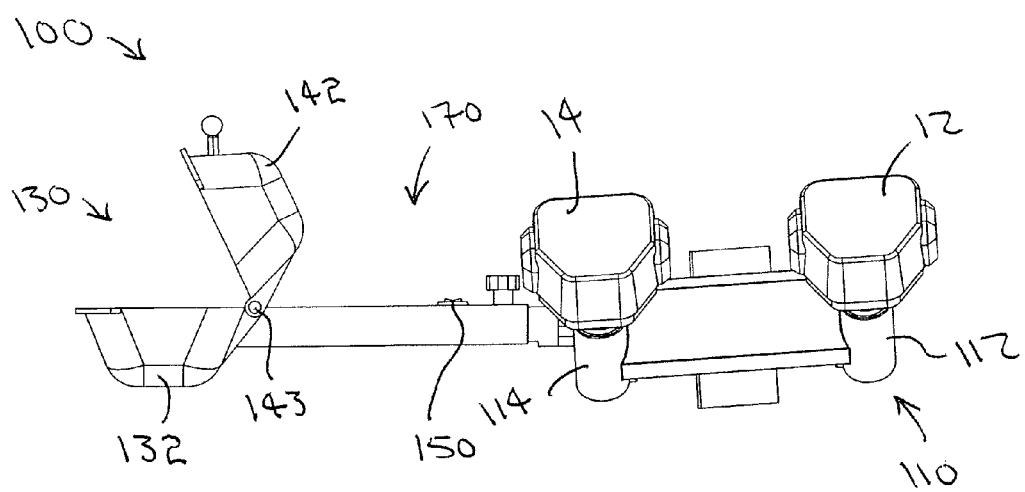
FIG. 2b is a side view of the grilling device as in FIG. 1.
Figure 3:
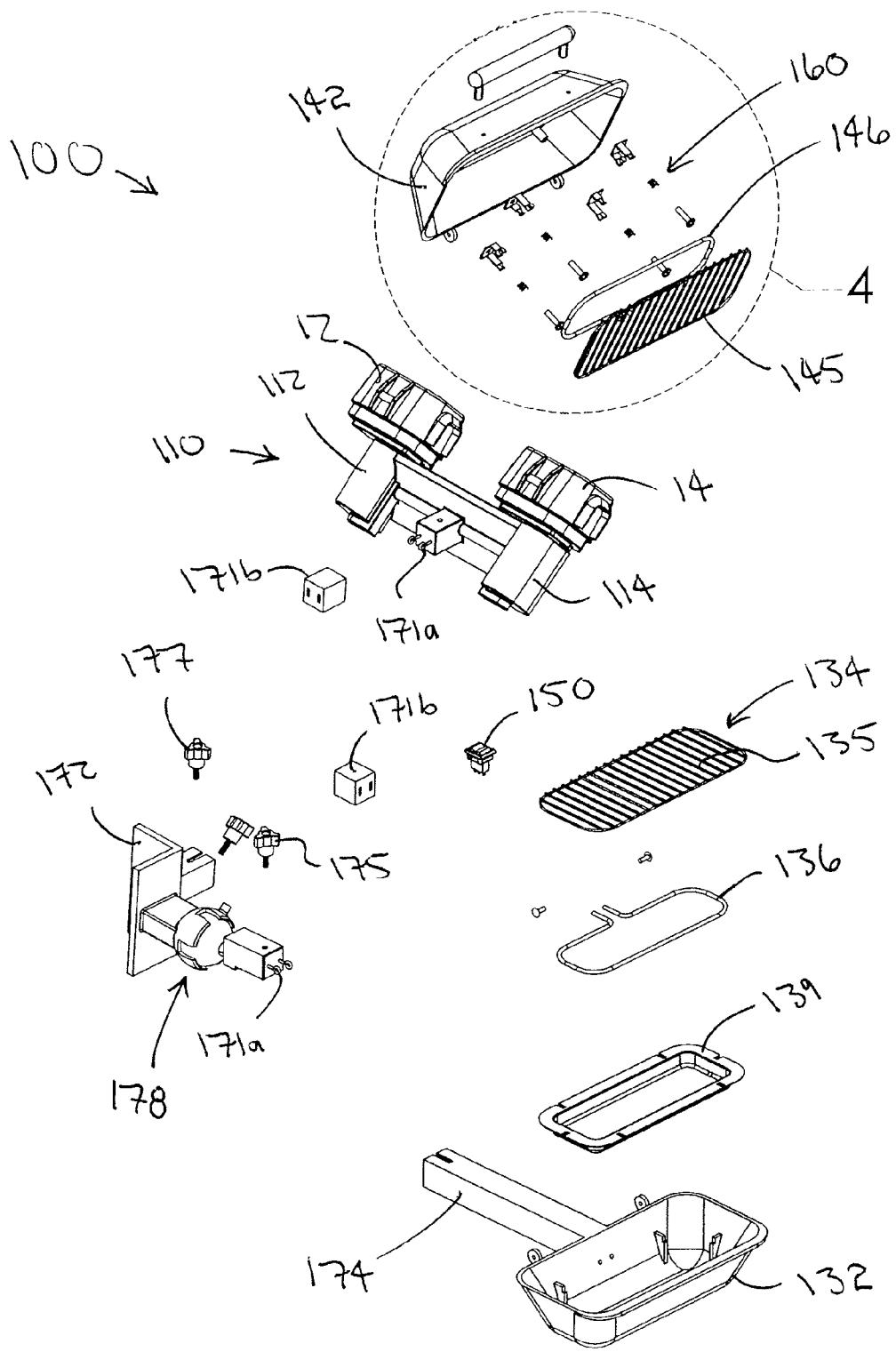
FIG. 3 is an exploded view of the grilling device as in FIG. 1.

The power adapter 110 may have a first receiving area 112 configured to receive one battery 12 and a second receiving area 114 configured to receive another battery 14, as shown in FIGS. 1 through 3. The power adapter 110 has circuitry for receiving electricity (e.g., at the receiving areas 112, 114) and producing a single electrical output. In some embodiments, the first and second receiving areas 112, 114 may be configured to each receive a rechargeable cordless tool battery, such as a rechargeable 18-volt cordless tool battery. Those skilled in the art will appreciate, however, that the receiving areas may be configured to receive different batteries and that different batteries may be used.

The grill portion 130 has a lower grill housing 132 (FIGS. 1, 2b, and 3) and a support element 134 operatively coupled to the lower grill housing 132. The lower grill housing 132 may be constructed of metal and/or other fire-resistant materials and may be any appropriate size, as will be appreciated by those skilled in the art. The support element 134 has a cooking surface 135 for receiving food thereon, and the support element 134 may be, for example, a metal grate (as shown in FIGS. 1 and 3) or a griddle. An electrical heating element 136 is positioned in the lower grill housing 132 below the cooking surface 135 (FIG. 1) and is in electrical communication with the single electrical output circuitry, and a catch pan 139 (FIG. 3) may also be below the cooking surface 135.

As shown in FIGS. 1 through 4, a lid 142 may be movably coupled to the lower grill housing 132 (e.g., by hinges 143) such that the lid 142 is movable between an open position 142a in which the cooking surface 135 is exposed (FIGS. 1 through 2b) and a closed position (not shown) in which the cooking surface 135 is covered. The lid 142 may be constructed of metal and/or other fire-resistant materials and may be sized complementary to the lower grill housing 132. Means may be included for maintaining the lid 142 at the closed position, such as a latch or springs in the hinges 143.

Figure 4:
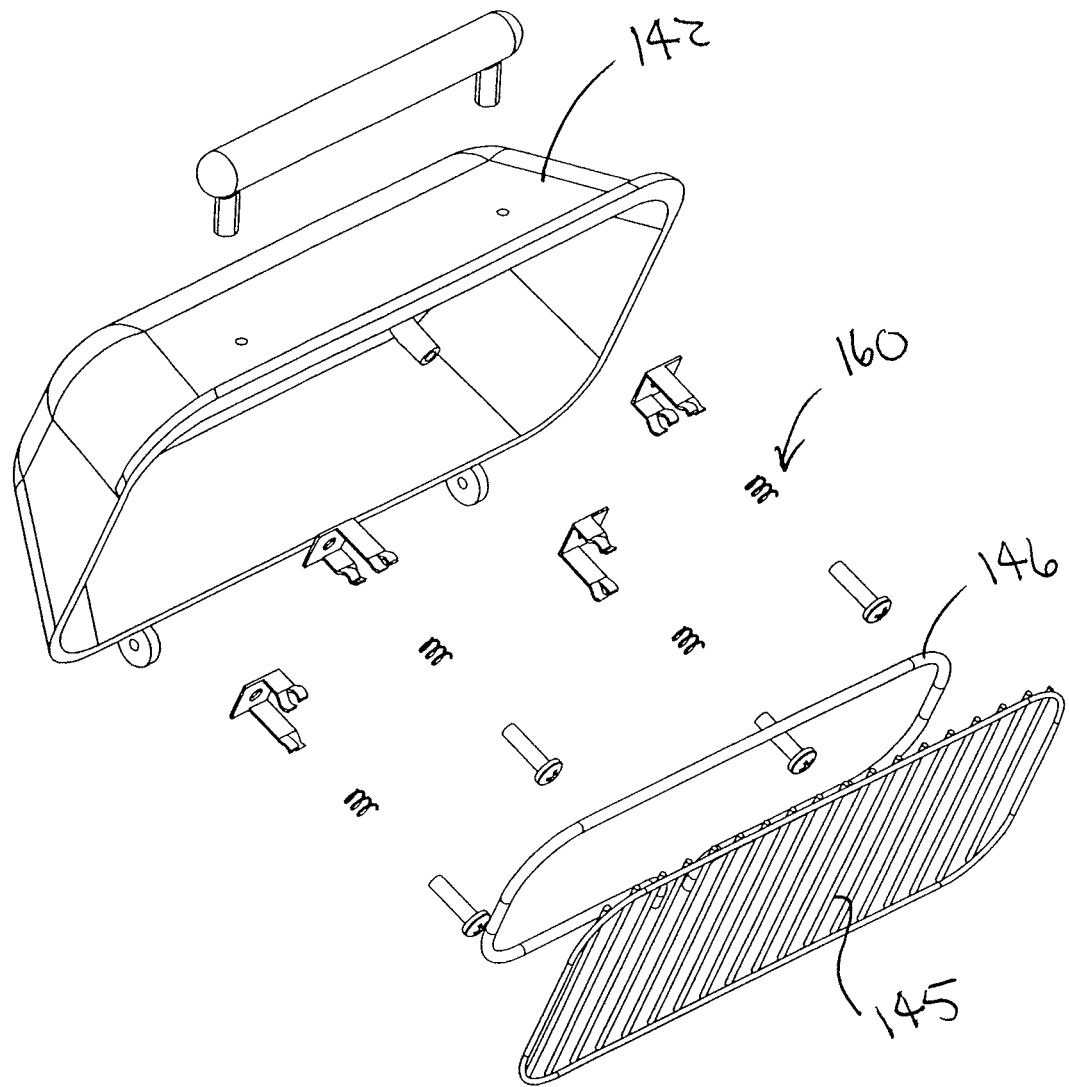
FIG. 4 is an exploded view on an enlarged scale of the lid removed from the lower grilling housing.

Another cooking surface 145 may be operatively coupled to the lid 142 and generally parallel to the cooking surface 135 when the lid 142 is at the closed position. The cooking surface 145 may be, for example, a metal grate (as shown in FIGS. 1, 3, and 4) or a griddle. Another electrical heating element 146 (FIGS. 1, 3, and 4) may be in the lid 142 above the cooking surface 145 and in electrical communication with the single electrical output circuitry.

A switch 150 (FIGS. 1 through 3) is in electrical communication with the single electrical output circuitry such that power from the single electrical output circuitry selectively powers the electrical heating element 136. The switch 150 or another switch in electrical communication with the single electrical output circuitry may similarly allow power from the single electrical output circuitry to selectively power the electrical heating element 146.

Figure 5A:
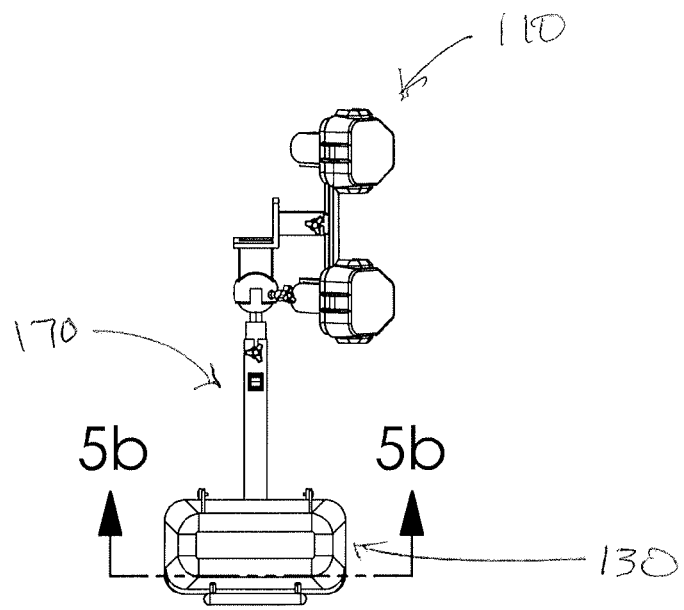
FIG. 5a is another top view of the grill housing as in FIG. 2.
Figure 5B:
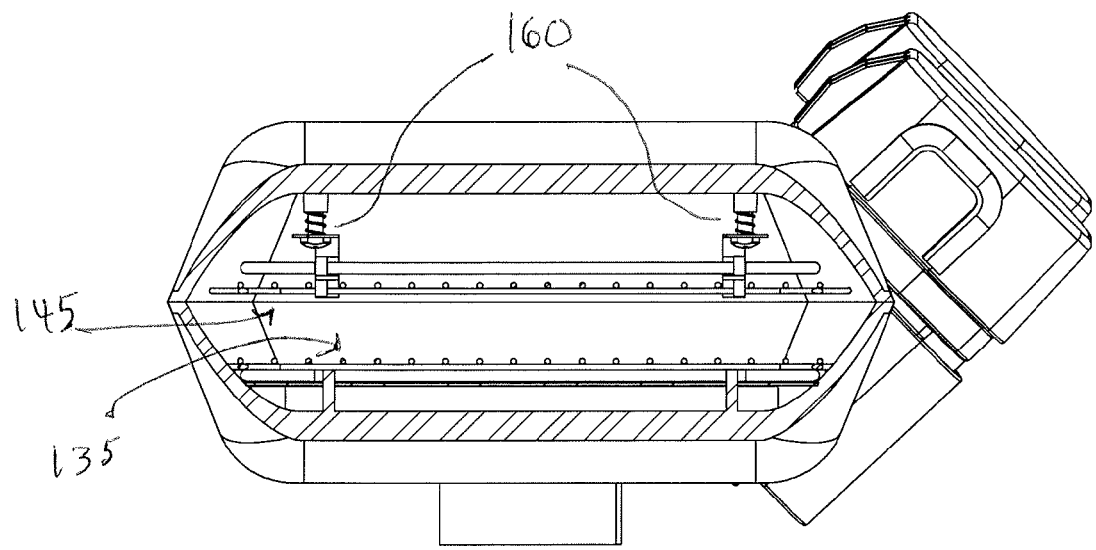

Means may be included for automatically adjusting the cooking surface 135 and/or the cooking surface 145 such that distance between the cooking surfaces 135, 145 is automatically adjusted when food is placed upon the cooking surface 135 and the lid 142 is moved to the closed position. For example, as best shown in FIG. 5, the cooking surface 145 may be operatively coupled to the lid 142 by spring members 160 that allow the cooking surface 145 to move relative to the cooking surface 135. Additionally, or alternately, the cooking surface 135 may be operatively coupled to the lower grill housing 132 by spring members 160 that allow the cooking surface 135 to move relative to the cooking surface 145. Due to the spring members 160, the cooking surfaces 135, 145 may be positioned relatively close together before food is placed atop the cooking surface 135 and the lid 142 is moved to the closed position, and then spread apart to allow food placed atop the cooking surface 135 to properly contact both cooking surfaces 135, 145 when the lid 142 is moved to the closed position.

As shown in FIGS. 1 through 3, the positioning portion 170 operatively couples the power adapter 110 to the grill portion 130. The coupling may be permanent or may be reversible (e.g., using plugs 171a, 171b shown in FIG. 3). The positioning portion 170 includes an attachment member 172 for securement to an object, and though not shown, the attachment member 172 may include a clamp, bolt, or other fastening element. A telescoping member 174 of the positioning portion 170 may be used to adjust spacing between the grill portion 130 and the receiving areas 112, 114 of the power adapter 110, and lock 175 may maintain the telescoping member 174 at various spacings. Similarly, a sliding member 176 of the positioning portion 170 may be used to adjust spacing between the grill portion 130 and the receiving areas 112, 114 of the power adapter 110, and lock 177 may maintain the sliding member 176 at various spacings. As shown in the drawings, the telescoping member 174 may further allow the grill portion 130 to move relative to the attachment member 172, and the sliding member 176 may allow the power adapter 110 to move relative to the attachment member 172. An angle-adjusting member 178 of the positioning portion 170 may be used to angularly adjust the grill portion 130 relative to the receiving areas 112, 114 of the power adapter 110. The angle-adjusting member 178 may be, for example, a lockable ball and socket joint, as shown in FIG. 1.

The adapter circuitry may also include means for determining an amount of voltage remaining in a battery or batteries received in respective receiving areas. It is understood that by determining a quantity of remaining voltage, it may be estimated how much time remains for powering the heating element(s). The quantity of voltage may be indicated to a user on a display, with one or more LED lights, a gauge, or the like (not shown) so that the user may plan grilling activity accordingly. In other embodiments, the adapter circuitry may even be configured to deactivate the heating element(s) when the voltage is less than a predetermined amount.

In use, the attachment member 172 may be coupled to any appropriate object, and the position of the power adapter 110 and the grill portion 130 may be adjusted using the telescoping member 172, the sliding member 176, and/or the angle-adjusting member 178, as set forth above. Either before or after the power adapter 110 and the grill portion 130 are positioned, batteries 12, 14 may be received in the receiving areas 112, 114. The circuitry may produce a single electrical output, which for example combines the output of the batteries 12, 14. By activating the switch 50, the single electrical output may power the electrical heating elements 136, 146 and warm the cooking surfaces 135, 145. It may be desirable for the lid 142 to be at the closed position while the cooking surfaces 135, 145 are warming. When the cooking surfaces 135, 145 are at the desired temperature, food may be placed upon the cooking surface 135 and the lid may again be returned to the closed position. Due, for example, to the spring members 160, distance between the cooking surfaces 135, 145 is automatically adjusted when the food is placed upon the cooking surface 135 and the lid 142 is moved to the closed position, as set forth in detail above.

It is understood that while certain forms of this invention have been illustrated and described, it is not limited thereto except insofar as such limitations are included in the following claims and allowable functional equivalents thereof.

The invention claimed is:

1. A portable grilling apparatus, comprising:
   a power adapter having a first receiving area configured to receive a rechargeable battery, said power adapter having electrical output circuitry for receiving electricity at said first receiving area and producing an electrical output;
   a grill portion including a lower grill housing;
   a support element operatively coupled to said grill portion, said support element having a cooking surface for receiving food thereon;
   an electrical heating element in said lower grill housing, said electrical heating element being below said cooking surface and in electrical communication with said electrical output circuitry;
   a switch in electrical communication with said electrical output circuitry such that power from said electrical output circuitry selectively powers said electrical heating element; and
   a positioning portion that operatively couples said power adapter to said grill portion, wherein said positioning portion includes a telescoping member.

2. The portable grilling apparatus of claim 1, wherein said telescoping member is configured to permit adjustment of a distance between said grill portion and said power adapter.

3. The portable grilling apparatus of claim 1, wherein said telescoping member includes a lock configured to maintain said telescoping member at a desired spacing.

4. The portable grilling apparatus of claim 1, wherein said positioning portion further includes an angle-adjusting member configured to permit said grill portion to be angularly adjusted relative to said first receiving area of said power adapter.

5. The portable grilling apparatus of claim 1, wherein said grilling portion further includes:
- a lid movably coupled to said lower grill housing and movable between an open position, in which said cooking surface is exposed, and a closed position, in which said cooking surface is enclosed; and
- a secondary cooking surface operatively coupled to said lid.

6. The portable grilling apparatus of claim 5, wherein said portable grilling apparatus further includes:
- means for automatically adjusting at least one of said cooking surface and said secondary cooking surface such that food on said cooking surface also contacts said secondary cooking surface when said lid is in said closed position.

7. The portable grilling apparatus of claim 6, wherein said means for automatically adjusting includes a spring-loaded means for automatically adjusting.

8. The portable grilling apparatus of claim 6, wherein said means for automatically adjusting includes a spring member that at least one of
- (i) operatively couples said secondary cooking surface to said lid and permits said secondary cooking surface to translate relative to said lid; and
- (ii) operatively couples said cooking surface to said lower grill housing and permits said cooking surface to translate relative to said lower grill housing.

9. The portable grilling apparatus of claim 1, wherein, said portable grilling apparatus further includes an attachment member that is operatively coupled to said power adapter and said grilling portion, wherein said attachment member is configured to couple said portable grilling apparatus to an object.

10. The portable grilling apparatus of claim 9, wherein said attachment member includes at least one of a clamp, a bolt, and a fastening element.

11. The portable grilling apparatus of claim 9, wherein said positioning portion further includes a sliding member configured to permit said grill portion to move relative to said attachment member.

12. The portable grilling apparatus of claim 1, wherein said rechargeable battery is a rechargeable cordless tool battery.

13. The portable grilling apparatus of claim 1, wherein said rechargeable battery is a first rechargeable battery, wherein said power adapter further includes a second receiving area configured to receive a second rechargeable battery, and further wherein said electrical output circuitry is configured for receiving electricity from said first receiving area and from said second receiving area to produce said electrical output.

14. A portable grilling apparatus, comprising:
- a power adapter having a first receiving area configured to receive a rechargeable battery, said power adapter having electrical output circuitry for receiving electricity at said first receiving area and producing an electrical output;
- a grill portion including a lower grill housing;
- a support element operatively coupled to said grill portion, said support element having a cooking surface for receiving food thereon;
- an electrical heating element in said lower grill housing, said electrical heating element being below said cooking surface and in electrical communication with said electrical output circuitry;
- a switch in electrical communication with said electrical output circuitry such that power from said electrical output circuitry selectively powers said electrical heating element; and
- a positioning portion that operatively couples said power adapter to said lower grill housing, wherein said positioning portion includes an angle-adjusting member.

15. The portable grilling apparatus of claim 14, wherein said angle-adjusting member includes a lockable ball and socket joint.

16. The portable grilling apparatus of claim 14, wherein said angle-adjusting member is configured to permit said grill portion to be angularly adjusted relative to said first receiving area of said power adapter.

17. The portable grilling apparatus of claim 14, wherein said portable grilling apparatus further includes:
- a lid movably coupled to said lower grill housing and movable between an open position, in which said cooking surface is exposed, and a closed position, in which said cooking surface is enclosed; and
- a secondary cooking surface operatively coupled to said lid.

18. The portable grilling apparatus of claim 14, wherein said portable grilling apparatus further includes:
- means for automatically adjusting at least one of said cooking surface and said secondary cooking surface such that food on said cooking surface also contacts said secondary cooking surface when said lid is in said closed position.

19. The portable grilling apparatus of claim 18, wherein said means for automatically adjusting includes a spring-loaded means for automatically adjusting.

20. The portable grilling apparatus of claim 18, wherein said means for automatically adjusting includes a spring member that at least one of:
- (i) operatively couples said secondary cooking surface to said lid and permits said secondary cooking surface to translate relative to said lid; and
- (ii) operatively couples said cooking surface to said lower grill housing and permits said cooking surface to translate relative to said lower grill housing.

21. The portable grilling apparatus of claim 14, wherein said portable grilling apparatus further includes an attachment member that is operatively coupled to said power adapter and said lower grill housing, wherein said attachment member is configured to couple said portable grilling apparatus to an object.

22. The portable grilling apparatus of claim 21, wherein said attachment member includes at least one of a clamp, a bolt, and a fastening element.

23. The portable grilling apparatus of claim 14, wherein said rechargeable battery is a rechargeable cordless tool battery.

24. The portable grilling apparatus of claim 14, wherein said rechargeable battery is a first rechargeable battery, wherein said power adapter further includes a second receiving area configured to receive a second rechargeable battery, and further wherein said electrical output circuitry is configured for receiving electricity from said first receiving area and from said second receiving area to produce said electrical output.

25. A portable grilling apparatus, comprising:
- a power adapter having a first receiving area configured to receive a rechargeable battery, said power adapter having electrical output circuitry for receiving electricity at said first receiving area and producing an electrical output;
- a grill portion including a lower grill housing;
- a support element operatively coupled to said grill portion, said support element having a cooking surface for receiving food thereon;

an electrical heating element in said lower grill housing, said electrical heating element being below said cooking surface and in electrical communication with said electrical output circuitry;

a switch in electrical communication with said electrical output circuitry such that power from said electrical output circuitry selectively powers said electrical heating element;

a lid movably coupled to said lower grill housing and movable between an open position, in which said cooking surface is exposed, and a closed position, in which said cooking surface is enclosed;

a secondary cooking surface operatively coupled to said lid; and means for automatically adjusting at least one of said cooking surface and said secondary cooking surface such that food on said cooking surface also contacts said secondary cooking surface when said lid is in said closed position.

26. The portable grilling apparatus of claim 25, wherein said portable grilling apparatus further includes an attachment member that is operatively coupled to said power adapter and said lower grill housing, wherein said attachment member is configured to couple said portable grilling apparatus to an object.

27. The portable grilling apparatus of claim 25, wherein said rechargeable battery is a rechargeable cordless tool battery.

28. The portable grilling apparatus of claim 25, wherein said rechargeable battery is a first rechargeable battery, wherein said power adapter further includes a second receiving area configured to receive a second rechargeable battery, and further wherein said electrical output circuitry is configured for receiving electricity from said first receiving area and from said second receiving area to produce said electrical output.

29. The portable grilling apparatus of claim 25, wherein said means for automatically adjusting includes a spring-loaded means for automatically adjusting.

30. The portable grilling apparatus of claim 25, wherein said means for automatically adjusting includes a spring member that at least one of:
  (i) operatively couples said secondary cooking surface to said lid and permits said secondary cooking surface to translate relative to said lid; and
  (ii) operatively couples said cooking surface to said lower grill housing and permits said cooking surface to translate relative to said lower grill housing.

31. A portable grilling apparatus, comprising:
a power adapter having a first receiving area configured to receive a rechargeable battery, said power adapter having electrical output circuitry for receiving electricity at said first receiving area and producing an electrical output;

a grill portion including a lower grill housing;

a support element operatively coupled to said grill portion, said support element having a cooking surface for receiving food thereon;

an electrical heating element in said lower grill housing, said electrical heating element being below said cooking surface and in electrical communication with said electrical output circuitry;

a switch in electrical communication with said electrical output circuitry such that power from said electrical output circuitry selectively powers said electrical heating element; and an attachment member operatively coupled to said power adapter and said lower grill housing, wherein said attachment member is configured to couple said portable grilling apparatus to an object.

32. The portable grilling apparatus of claim 31, wherein said attachment member includes at least one of a clamp, a bolt, and a fastening element.

33. The portable grilling apparatus of claim 31, wherein said rechargeable battery is a rechargeable cordless tool battery.

34. The portable grilling apparatus of claim 31, wherein said rechargeable battery is a first rechargeable battery, wherein said power adapter further includes a second receiving area configured to receive a second rechargeable battery, and further wherein said electrical output circuitry is configured for receiving electricity from said first receiving area and from said second receiving area to produce said electrical output.

35. The portable grilling apparatus of claim 31, wherein said portable grilling apparatus further includes:
  a lid movably coupled to said lower grill housing and movable between an open position, in which said cooking surface is exposed, and a closed position, in which said cooking surface is enclosed;
  a secondary cooking surface operatively coupled to said lid; and
  means for automatically adjusting at least one of said cooking surface and said secondary cooking surface such that food on said cooking surface also contacts said secondary cooking surface when said lid is in said closed position, wherein said means for automatically adjusting includes a spring member that at least one of
  (i) operatively couples said secondary cooking surface to said lid and permits said secondary cooking surface to translate relative to said lid; and
  (ii) operatively couples said cooking surface to said lower grill housing and permits said cooking surface to translate relative to said lower grill housing.

* * * * *